(12) United States Patent
Hsieh et al.

(10) Patent No.: US 8,741,398 B2
(45) Date of Patent: Jun. 3, 2014

(54) LIQUID CRYSTAL PANEL AND ALIGNMENT FILM THEREOF

(75) Inventors: Chung-Ching Hsieh, Shenzhen (CN); Cheng-ming He, Shenzhen (CN)

(73) Assignee: Shenzhen China Star Optoelectronics Technology Co., Ltd., Guangdong (CN)

(*) Notice: Subject to any disclaimer, the term of this patent is extended or adjusted under 35 U.S.C. 154(b) by 0 days.

(21) Appl. No.: 13/380,899

(22) PCT Filed: Oct. 21, 2011

(86) PCT No.: PCT/CN2011/081096
§ 371 (c)(1),
(2), (4) Date: Dec. 26, 2011

(87) PCT Pub. No.: WO2013/056462
PCT Pub. Date: Apr. 25, 2013

(65) Prior Publication Data
US 2013/0100387 A1    Apr. 25, 2013

(30) Foreign Application Priority Data
Oct. 20, 2011    (CN) .......................... 2011 1 0321017

(51) Int. Cl.
*C09K 19/00*    (2006.01)
*G02F 1/1337*    (2006.01)
*C08G 69/14*    (2006.01)

(52) U.S. Cl.
USPC ........... 428/1.26; 349/123; 349/135; 428/1.2; 528/324

(58) Field of Classification Search
None
See application file for complete search history.

(56) References Cited

U.S. PATENT DOCUMENTS

| | | | |
|---|---|---|---|
| 6,313,348 B1* | 11/2001 | Gibbons et al. | 564/305 |
| 2009/0280236 A1* | 11/2009 | Hsueh | 427/58 |
| 2012/0013836 A1* | 1/2012 | Teraoka et al. | 349/124 |

FOREIGN PATENT DOCUMENTS

WO    WO 2010106915 A1 *    9/2010

* cited by examiner

*Primary Examiner* — Gwendolyn Blackwell
*Assistant Examiner* — Anthony J Frost

(57) ABSTRACT

The present invention provides a liquid crystal panel and an alignment film thereof, and the alignment film is made of a modified polyimide which has conjugated double bond at side chain. Resistance value of the alignment film is less than the resistance value of a liquid crystal material of the liquid crystal panel by properties of the conjugated double bond that can reduce the resistance value of a prior art polyimide. In addition, improving the imidization ratio of a modified polyimide alignment film is important. The present invention is conducted the charged ion from liquid crystal layer to the alignment film by the conjugated double bond of the modified polyimide at the side chain to prevent the increase in the ion density of the liquid crystal in part of this area, and improve the problem of image sticking.

14 Claims, 2 Drawing Sheets

LIQUID CRYSTAL PANEL AND ALIGNMENT FILM THEREOF

BACKGROUND OF THE INVENTION

1. Field of the Invention

The present invention relates to a liquid crystal panel and alignment film thereof, and more specifically to a liquid crystal display has a modified polyimide alignment film that reduces image sticking.

2. Description of the Prior Art

Liquid crystal displays have been widely used in various electronic products. Please refer to FIG. 1, a liquid crystal panel 10 includes a pair of substrates 11, 12 which are correspondingly arranged, a liquid crystal layer 13 sandwiched between the substrates 11, 12, and two alignment films 14, 15 arranged on the substrates 11, 12 and adjacent to the liquid crystal layer 13.

The liquid crystal displays are normally used to display dynamic and static frames. After a static frame has been shown on a liquid crystal display for an extended period, a residual image or profile would easily stick to the display frame when another frame is displayed. This is because the liquid crystal molecules inside the liquid crystal display need to be driven by a high voltage for a prolonged period in order to display the static frame, thereby leads to an increase in the ion density of the liquid crystal. When the liquid crystal display needs to display the next frame, the driving voltage cannot accurately control the state of alignment of the liquid crystal molecules in this area because the ion density of liquid crystal in part of this area has been changed. Thus, the gray level brightness of the frame in this area of the liquid crystal display will not be the expected one. As a result, the next display frame is likely to have a darker or a brighter image profile.

Therefore, there is a need to provide the liquid crystal panel and alignment film thereof which can improve the problem of image sticking, so as to overcome the disadvantage in the prior art.

BRIEF SUMMARY OF THE INVENTION

The present invention is to provide a liquid crystal panel and alignment film thereof to solve the problem of image sticking in the prior art.

An object of the present invention is to provide the liquid crystal panel and alignment film thereof which can improve the problem of image sticking, and the alignment film is made of a modified polyimide. Side chain of a prior art polyimide is modified as a structure of conjugated double bond to obtain the modified polyimide. The resistivity value of the alignment film is less than a resistivity value of a liquid crystal material of the liquid crystal panel by properties of the conjugated double bond that can reduce the resistivity value of the prior art polyimide. In addition, improving the imidization ratio of a modified polyimide alignment film is important. The present invention is conducted the charged ion from liquid crystal layer to the alignment film by the conjugated double bond of the modified polyimide at the side chain to prevent the increase in the ion density of the liquid crystal in part of this area, and to thus improve the problem of image sticking.

To achieve the above object, the present invention provides the alignment film of the liquid crystal panel. Wherein, a pair of substrates of the liquid crystal panel is coated with the modified polyimide as the alignment film of the liquid crystal panel. The alignment film is made of the modified polyimide having a structure of the conjugated double bond at the side chain thereof, and the modified polyimide has a structural formula (I):

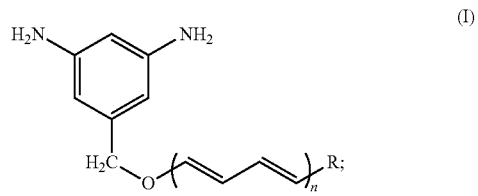

wherein n is 1 or an integer greater than 1; and R is H or a carbon chain of $C_1$ to $C_5$.

In one exemplary embodiment of the present invention, the alignment film of the liquid crystal panel is made of the modified polyimide, and the liquid crystal panel further contains the liquid crystal material, and the resistivity value of the modified polyimide is less than the resistivity value of the liquid crystal material.

In one exemplary embodiment of the present invention, the resistivity value of the modified polyimide is less than or equal to $10^{12}$ Ωcm.

In one exemplary embodiment of the present invention, the alignment film of the substrates further contains a type of polyimide having a structural formula (II):

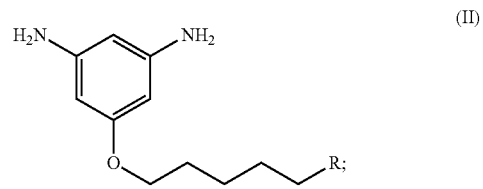

wherein weight ratio of the modified polyimide with the structural formula (I) is greater than or equal to 70 wt % based on the total weight of the alignment film, and the rest of the weight ratio is the polyimide having the structural formula (II).

Furthermore, the present invention provides the liquid crystal panel includes a first substrate having a first alignment film, a second substrate having a second alignment film, and the liquid crystal material is filled in a space between the first substrate and the second substrate, wherein the liquid crystal material is in contact with the first alignment film and the second alignment film; wherein, the first alignment film and the second alignment film are made of the modified polyimide having a structure of the conjugated double bond at the side chain thereof, and the modified polyimide has the structural formula (I):

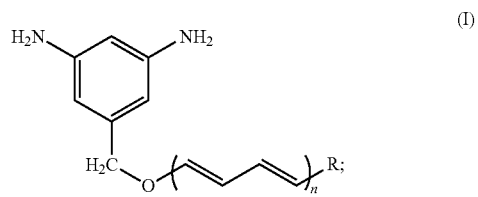

wherein n is 1 or an integer greater than 1; and R is H or the carbon chain of $C_1$ to $C_5$.

In one exemplary embodiment of the present invention, the resistivity value of the modified polyimide is less than the resistivity value of the liquid crystal material.

In one exemplary embodiment of the present invention, the resistance value of the modified polyimide is less than or equal to $10^{12}$ Ωcm.

In one exemplary embodiment of the present invention, the first alignment film further contains a type of polyimide having the structural formula (II):

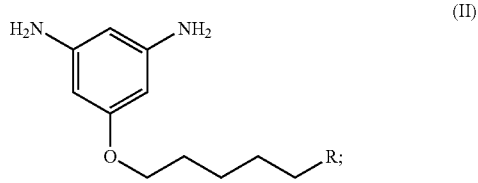

(II)

wherein the weight ratio of the modified polyimide with the structural formula (I) is greater than or equal to 70 wt % based on the total weight of the first alignment film, and the rest of the weight ratio is the polyimide having the structural formula (II).

In one exemplary embodiment of the present invention, the second alignment film further contains a type of polyimide having the structural formula (II):

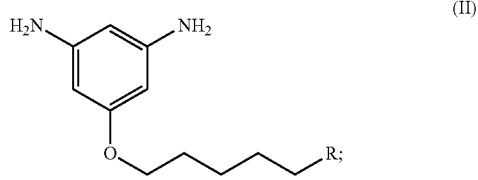

(II)

wherein the weight ratio of the modified polyimide with the structural formula (I) is greater than or equal to 70 wt % based on the total weight of the second alignment film, and the rest of the weight ratio is the polyimide having the structural formula (II).

In one exemplary embodiment of the present invention, the first substrate is a thin film transistor (TFT) array substrate, and the second substrate is a color filter substrate.

The present invention has obvious advantages and beneficial effects than prior art. The liquid crystal panel and alignment film thereof of the present invention has at least the following advantages and beneficial effects by above technical scheme. The modified polyimide alignment film of the present invention has a better electrical conductivity by modifying the side chain of polyimide to the conjugated double bond, that can be conducted the charged ion from liquid crystal layer to the alignment film, thus improving the problem of image sticking.

DETAILED DESCRIPTION OF THE PREFERRED EMBODIMENTS

Various preferred embodiments are now described with reference to the accompanying drawings. In the following description, for purposes of explanation, numerous specific details are set forth in order to provide a thorough understanding of a liquid crystal panel and alignment film thereof, and its specific embodiment, structure, feature and functions.

Figure 1:
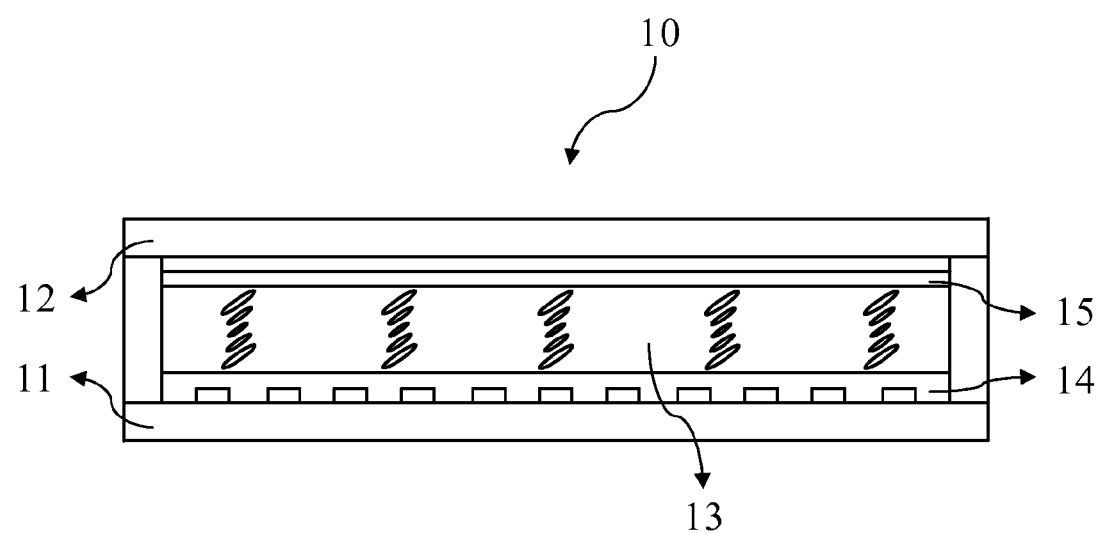
FIG. 1 is a schematic view of a structure of a liquid crystal panel of prior art.
Figure 2:
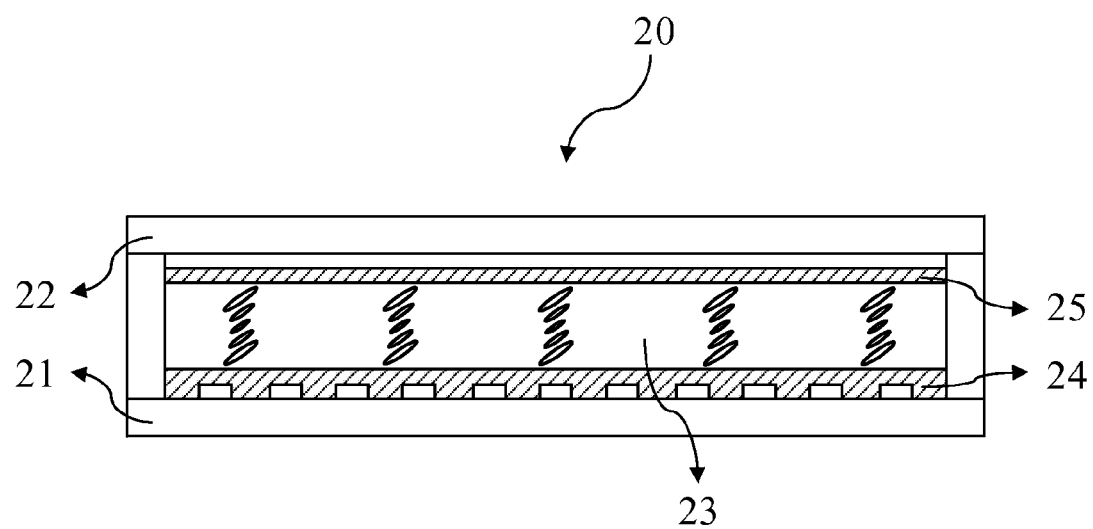
FIG. 2 is a schematic view of a structure of a liquid crystal panel according to the present invention.

The present invention discloses a liquid crystal panel and an alignment film thereof. Please refer to FIG. 2, the liquid crystal panel 20 of a preferred embodiment of the present invention includes a first substrate 21, a second substrate 22, a liquid crystal material 23, a first alignment film 24, and a second alignment film 25. The first substrate 21 and the second substrate 22 are correspondingly arranged. The first substrate 21 is a thin film transistor array substrate, and the second substrate 22 is a color filter substrate. The liquid crystal material 23 is filled in between the first substrate 21 and the second substrate 22. The first alignment film 24 is arranged on inner surface of the first substrate 21, and the first alignment film 24 covers the thin film transistor array (not shown in the figure) of the inner surface of the first substrate 21. The second alignment film 25 is arranged on the inner surface of the second substrate 22, and the second alignment film 25 covers the color filter substrate (not shown in the figure) of the inner surface of the second substrate 22. The liquid crystal material 23 is physical contacted with the first alignment film 24 and the second alignment film 25.

The first alignment film 24 and the second alignment film 25 of the present invention will now be discussed in further detail. The first alignment film 24 and the second alignment film 25 of the present invention are polyimide as a subject for modification. The polyimide is an aromatic heterocyclic polymer containing imide rings in main chain. The inventors have done intensive studies to solve the subject, and the polyimide is modified by introduction of a functional side group in molecular chain of polyimide. Side chain with conjugated structure is introduced onto the main chain of polyimide to form a modified polyimide (as shown in structural formula (I)), and the modified polyimide has a better electrical conductivity. Therefore, resistance value of the modified polyimide is less than the resistance value of a liquid crystal material 23, so that can be conducted the charged ion from liquid crystal material 23 to the modified polyimide, thus improving the problem of image sticking of the liquid crystal panel 20.

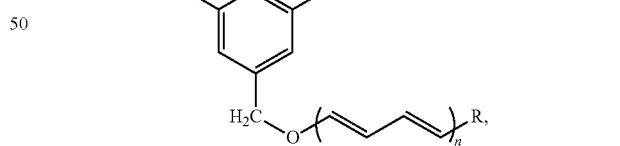

(I)

wherein n is 1 or an integer greater than 1, and R is H or a carbon chain of $C_1$ to $C_5$.

In order to polymerize the modified polyimide with structural formula (I), the present invention proposes molecular structure of a traditional polyimide with structural formula (II) as a reactant. The side chain of the traditional polyimide is modified as a structure of conjugated double bond to obtain the modified polyimide. The side chain of the modified polyimide has the structure of conjugated double bond, thus also has properties of the conjugated double bond.

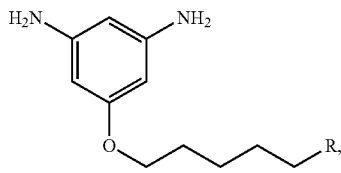

(II)

wherein R is H or a carbon chain of $C_1$ to $C_5$.

Please refer to Table 1, which is a measurement data of the resistance value and the image sticking of unmodified/modified polyimide. The resistance value of the traditional polyimide alignment film is $10^{13}$ Ωcm, and modified polyimide alignment film of the present invention is $10^{12}$ Ωcm as show in Table 1, therefore proving that the modified polyimide of the present invention has the properties of the conjugated double bond by modifying the side chain of polyimide to the conjugated double bond, that can be reduce the resistance value of a traditional polyimide. Thus, the resistance value of the modified polyimide is less than the resistance value of the liquid crystal material 23.

TABLE 1

| | Resistance value | Image sticking verification |
| --- | --- | --- |
| Traditional polyimide | $10^{13}$ Ωcm | Pass 360 hr |
| Modified polyimide | $10^{12}$ Ωcm | Pass 2112 hr |

Please refer to Table 1 again, in parts of image sticking verification, the modified polyimide alignment film has the problem of image sticking at passing 2112 hours, and the polyimide alignment film of the prior art has the problem of image sticking at passing 360 hours by maintenance of specific voltage under the same conditions. The above results show that for problem of image sticking, the modified polyimide of the present invention is improved about six times than the prior art polyimide.

As above-mentioned, the modified polyimide alignment film of the present invention has a better electrical conductivity by modifying the side chain of polyimide to the conjugated double bond, that can be conducted the charged ion from liquid crystal layer to the alignment film, thus improving the problem of image sticking of the liquid crystal panel 20.

The above description of the invention is intended to be illustrative and not limiting. Various changes or modifications in the embodiments described may occur to those skilled in the art. These can be achieved without departing from the spirit or scope of the invention.

What is claimed is:

1. A liquid crystal panel, characterized in that: the liquid crystal panel comprises:
    a first substrate having a first alignment film;
    a second substrate having a second alignment film; and
    a liquid crystal material for filling in a space between the first substrate and the second substrate, wherein the liquid crystal material is in contact with the first alignment film and the second alignment;
    wherein the first alignment film and the second alignment film are made of a modified polyimide having a structure of conjugated double bond at side chain thereof, and the resistance value of the modified polyimide is less than the resistance value of the liquid crystal material, and the structure of conjugated double bond at the side chain of the modified polyimide has a structural formula (I):

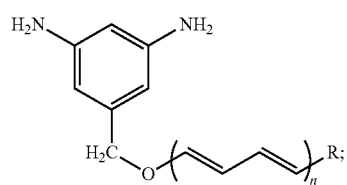

(I)

wherein n is 1 or an integer greater than 1; and R is H or a carbon chain of $C_1$ to $C_5$;
wherein the first substrate is a thin film transistor (TFT) array substrate, and the second substrate is a color filter substrate.

2. The liquid crystal panel of claim 1, characterized in that; the resistance value of the modified polyimide is less than or equal to $10^{12}$ Ωcm.

3. The liquid crystal panel of claim 1, characterized in that: the first alignment film further contains a type of polyimide having a structure of conjugated double bond at side chain thereof having a structural formula (II):

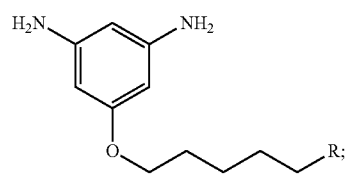

(II)

wherein weight ratio of the modified polyimide with the structural formula (I) is greater than or equal to 70 wt % based on the total weight of the first alignment film, and the rest of the weight ratio is the polyimide having the structural formula (II).

4. The liquid crystal panel of claim 1, characterized in that: the second alignment film further contains a type of polyimide having a structure of conjugated double bond at side chain thereof having a structural formula (II):

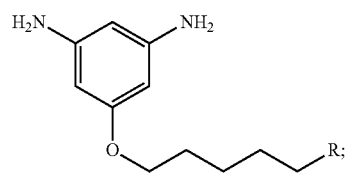

(II)

wherein the weight ratio of the modified polyimide with the structural formula (I) is greater than or equal to 70 wt % based on the total weight of the second alignment film, and the rest of the weight ratio is the polyimide having the structural formula (II).

5. An alignment film of a liquid crystal panel, coated on a substrate of the liquid crystal panel, characterized in that: the alignment film is made of a modified polyimide having a structure of conjugated double bond at side chain thereof, and the structure of conjugated double bond at the side chain of the modified polyimide has a structural formula (I):

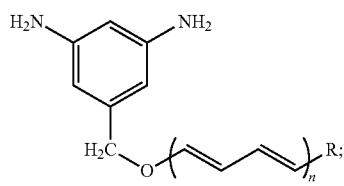 (I)

wherein n is 1 or an integer greater than 1; and R is H or a carbon chain of $C_1$ to $C_5$.

6. The alignment film of the liquid crystal panel of claim 5, characterized in that: the liquid crystal panel further contains a liquid crystal material, and the resistance value of the modified polyimide is less than the resistance value of the liquid crystal material.

7. The alignment film of the liquid crystal panel of claim 6, characterized in that: the resistance value of the modified polyimide is less than or equal to $10^{12}$ Ωcm.

8. The alignment film of the liquid crystal panel of claim 5, characterized in that: the alignment film of the substrate further contains a type of polyimide having a structure of conjugated double bond at side chain thereof having a structural formula (II):

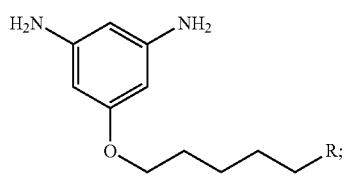 (II)

wherein the weight ratio of the modified polyimide with the structural formula (I) is greater than or equal to 70 wt % based on the total weight of the alignment film, and the rest of the weight ratio is the polyimide having the structural formula (II).

9. A liquid crystal panel, characterized in that: the liquid crystal panel comprises:
a first substrate having a first alignment film;
a second substrate having a second alignment film; and
a liquid crystal material for filling in a space between the first substrate and the second substrate, wherein the liquid crystal material is in contact with the first alignment film and the second alignment film;
wherein the first alignment film and the second alignment film are made of a modified polyimide having a structure of conjugated double bond at side chain thereof, and the structure of conjugated double bond at the side chain of the modified polyimide has a structural formula (I):

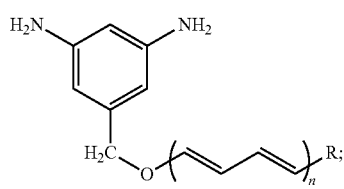 (I)

wherein n is 1 or an integer greater than 1; and R is H or a carbon chain of $C_1$ to $C_5$.

10. The liquid crystal panel of claim 9, characterized in that: the resistance value of the modified polyimide is less than the resistance value of the liquid crystal material.

11. The liquid crystal panel of claim 10, characterized in that: the resistance value of the modified polyimide is less than or equal to $10^{12}$ Ωcm.

12. The liquid crystal panel of claim 9, characterized in that: the first alignment film further contains a type of polyimide having a structure of conjugated double bond at side chain thereof having a structural formula (II):

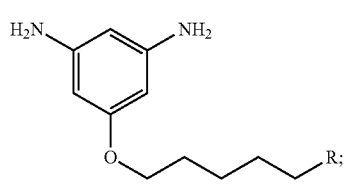 (II)

wherein the weight ratio of the modified polyimide with the structural formula (I) is greater than or equal to 70 wt % based on the total weight of the first alignment film, and the rest of the weight ratio is the polyimide having the structural formula (II).

13. The liquid crystal panel of claim 9, characterized in that: the second alignment film further contains a type of polyimide having a structure of conjugated double bond at side chain thereof having a structural formula (II):

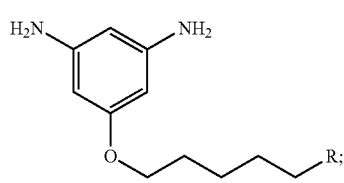 (II)

wherein the weight ratio of the modified polyimide with the structural formula (I) is greater than or equal to 70 wt % based on the total weight of the second alignment film, and the rest of the weight ratio is the polyimide having the structural formula (II).

14. The liquid crystal panel of claim 9, characterized in that: the first substrate is a thin film transistor array substrate, and the second substrate is a color filter substrate.

* * * * *